United States Patent
Bjørgulf Haukelidsæter et al.

(10) Patent No.: US 12,085,213 B2
(45) Date of Patent: Sep. 10, 2024

(54) FIV REDUCING DEVICE WITH AUTOMATED CONTROL OF NATURAL FREQUENCY

(71) Applicant: Equinor Energy AS, Stavanger (NO)

(72) Inventors: Eidesen Bjørgulf Haukelidsæter, Stavanger (NO); Ellingsen Kjell Einar, Tananger (NO)

(73) Assignee: Equinor Energy AS, Stavanger (NO)

( * ) Notice: Subject to any disclaimer, the term of this patent is extended or adjusted under 35 U.S.C. 154(b) by 167 days.

(21) Appl. No.: 17/441,179

(22) PCT Filed: Mar. 20, 2020

(86) PCT No.: PCT/NO2020/050080
§ 371 (c)(1),
(2) Date: Sep. 20, 2021

(87) PCT Pub. No.: WO2020/190152
PCT Pub. Date: Sep. 24, 2020

(65) Prior Publication Data
US 2022/0163159 A1 May 26, 2022

(30) Foreign Application Priority Data
Mar. 21, 2019 (GB) ...................... 1903886

(51) Int. Cl.
*E21B 41/00* (2006.01)
*F16F 15/00* (2006.01)
(Continued)

(52) U.S. Cl.
CPC .......... *F16L 55/041* (2013.01); *F16F 15/002* (2013.01); *F16F 15/02* (2013.01); *F16L 3/1091* (2013.01); *E21B 41/0007* (2013.01)

(58) Field of Classification Search
CPC ... E21B 41/0007; F16L 3/1091; F16L 55/041; F16F 15/002; F16F 15/02
See application file for complete search history.

(56) References Cited

U.S. PATENT DOCUMENTS 9,617,803 B2  4/2017  Wu et al.
2002/0074133 A1  6/2002  McMillan et al.
(Continued)

FOREIGN PATENT DOCUMENTS

CN  107246454 A  * 10/2017  .............. F16F 15/08
DE  202016101495 U1 *  7/2017
(Continued)

OTHER PUBLICATIONS

Jun. 2, 2020—(WO) International Search Report and Written Opinion—App PCT/NO2020/050080.
(Continued)

*Primary Examiner* — Matthew R Buck
(74) *Attorney, Agent, or Firm* — Banner & Witcoff, Ltd.

(57) ABSTRACT

An apparatus for controlling flow induced vibrations in a section of pipeline caused by a flow of liquid therethrough comprising: a sensor for measuring flow induced vibrations of the section of pipeline; a mechanical means for adjusting the natural frequency of the section of pipeline; wherein the mechanical means automatically adjusts the natural frequency of the section of pipeline based on the measured vibration in order to reduce the flow induced vibration.

19 Claims, 5 Drawing Sheets

(51) Int. Cl.
*F16F 15/02* (2006.01)
*F16L 3/10* (2006.01)
*F16L 55/04* (2006.01)

(56) References Cited

U.S. PATENT DOCUMENTS

| | | | |
|---|---|---|---|
| 2014/0262656 A1* | 9/2014 | Song | F16F 7/116 188/378 |
| 2015/0020517 A1* | 1/2015 | Ren | F16L 55/041 60/469 |
| 2015/0053498 A1 | 2/2015 | Jung et al. | |
| 2017/0037717 A1* | 2/2017 | Oehring | F04B 19/22 |
| 2018/0156026 A1* | 6/2018 | Kalia | E21B 17/006 |

FOREIGN PATENT DOCUMENTS

| | | | |
|---|---|---|---|
| GB | 2565554 A | 2/2019 | |
| JP | H1082482 A | 3/1998 | |
| JP | 2013050134 A | 3/2013 | |
| WO | 2014067811 A1 | 5/2014 | |
| WO | 2017183991 A1 | 10/2017 | |
| WO | 2019034498 A1 | 2/2019 | |

OTHER PUBLICATIONS

Jul. 16, 2019—(GB) Search Report—APP 1903886.8.
Dec. 17, 2019—(GB) Corrected Search Report—APP 1903886.8.

* cited by examiner

FIV REDUCING DEVICE WITH AUTOMATED CONTROL OF NATURAL FREQUENCY

The present application is a U.S. National Phase of International Application No. PCT/NO2020/050080, which was filed on Mar. 20, 2020, designating the U.S. of America and claiming priority to United Kingdom Patent Application No. 1903886.8, filed on Mar. 21, 2019. This application claims priority to and the benefit of the above-identified applications, which are all fully incorporated by reference herein in their entireties.

The present invention concerns a method and apparatus for the control of a natural frequency of a section of piping in order to reduce flow induced vibrations (FIV) caused by a flow of liquid therethrough. It is particularly useful for, but not limited to, the control of the natural frequency of sections of piping in offshore hydrocarbon production and processing facilities, especially those located subsea.

Various flow lines comprising pipe sections are used to interconnect components of subsea hydrocarbon production and processing facilities. For example, pipe sections are used to provide fluid communication between subsea structures on the sea floor. One example of such flow lines is the connection between a subsea manifold structure to one or more Christmas trees which are in turn connected via a wellhead to subterranean reservoirs containing hydrocarbons such as oil and gas (referred to collectively as produced fluid). These flow lines pass the produced fluid of the reservoir from the Christmas trees to the manifold. During the deployment of subsea facilities, structures such as the manifold and Christmas trees are typically submerged and positioned on the sea floor prior to the interconnection of the flow lines.

Because of the large tolerances required in relation to the connections between the subsea structures (for example due to the unevenness or settling of the sea bed), the pipe sections used to connect the subsea structures incorporate spools having bends that provide the necessary tolerances and allow them to be manipulated into position. One such pipe section with an 'M-shape' is shown in US 2018/0156026, and comprises a U bend at each end of the pipe section that allows the ends of the pipe section to be manipulated/bent in order to meet connection points on the various subsea structures and accommodate some misalignment. A simple straight conduit would not be capable of meeting the required tolerances for such connections.

An undesired effect of the designs used to accommodate these tolerances is that the pipe sections used to form the flow lines are more susceptible to vibrations. In particular, when the produced fluid flows through the pipe sections, they are more prone to flow induced vibrations (FIV).

The subsea installations such as those described above are time consuming and expensive to install and the dynamic loads associated with flow induced vibrations during use can damage and/or fatigue the pipe sections, resulting in failure or a need for regular maintenance/repair. In order to avoid this, the pipe sections connecting the subsea structures must be highly reliable and durable.

Flow induced vibrations are particularly troublesome when the vibrations approach the natural frequency of any given pipe section. When forced vibrations such as FIV approach the natural frequency of a pipe section, the amplitude of vibration greatly increases due to resonance. These increased amplitudes pose a greater risk of damage and fatigue to the pipe sections.

A difficulty that exists in dealing with FIV is that it is dependent on factors such as the flow velocity and density of the liquid in the pipe section which can vary during the lifetime of a hydrocarbon facility. The natural frequency of a pipe section can also change over the lifetime of the well, due to settling of the seabed for example.

US 2018/0156026 discloses a system and method for measuring the vibration and/or load in a subsea pipe section that conveys produced fluid. The measurement of the vibration or load is carried out by at least one electronic sensor on the pipe section which may be an accelerometer. The data provided by this sensor can indicate the presence of potentially damaging vibrational conditions such as FIV.

The data provided by the sensor is transmitted to a control system and compared against a predetermined threshold to indicate whether or not the FIV pose a risk. Whilst this document discusses the identification of FIV, the main strategy proposed for mitigating FIV is to reduce flow rate through the pipe when the measurement from the vibration sensor exceeds the predetermined threshold. This is undesirable as it reduces the maximum output of the hydrocarbon collection facility.

The only other discussion in US 2018/0156026 regarding the mitigation of FIV, or reduction of such vibrations, is through the fitting of a vibration suppression device to the exterior of the pipe section. This device is clamped around the circumference of the pipe section and comprises a number of axial plates that are parallel with the pipe section axis and extend radially outwards. These plates act as fins in the water and increase the hydrodynamic mass of the pipe section, thereby damping the FIV. However, this approach does not address the underlying issue of resonance, nor can it address changes in the relevant parameters over time.

It is also generally known in the art to provide various forms of clamps and struts for securing pipes in position, which will inherently have an effect on the natural frequency of the system and hence when or whether FIV will occur. However, they do not address the problem of reducing FIV that might subsequently occur unexpectedly, e.g. due to changes in the relevant parameters.

In one aspect, the present invention provides a method of controlling flow induced vibrations in a section of pipeline caused by a flow of liquid therethrough, comprising: measuring a flow induced vibration of the section of pipeline; and automatically adjusting the natural frequency of the section of pipeline based on the measured vibration in order to reduce the flow induced vibration.

Thus, by means of the invention FIV may be measured in a pipe section and, in response to these measurements, the natural frequency of the pipe section may be altered to move it away from resonance. This is most conveniently achieved by applying a force to the section of pipeline, typically a tensile force, though in some embodiments the force may be compressive (or indeed there may be a combination of both).

The force may be applied to directly affect the tension within the pipe itself (c.f. tuning a guitar string). Accordingly, the force may be applied in a direction substantially parallel to the axis of the section of pipeline. This may be done by dividing the pipe section into two parts, whereby the force is applied between a first part of the section of pipeline and an adjacent second part of the section of pipeline, wherein the adjacent ends of the first and second parts are moveable relative to one another along their axis.

However, alternatively, the force may be applied in a direction substantially perpendicular to the axis of the section of pipeline. This will result in both compressive and tensile forces within the pipeline itself. Of course, the perpendicular force may be a component of a larger force acting in a different direction, but in order to minimise the total force applied, preferably the force is applied substantially only in the perpendicular direction.

The force may be applied between the section of pipeline and a fixed structure and/or the tension may be applied between the section of pipeline and a further section of pipeline.

In order to apply the appropriate force, the method preferably further comprises the steps of determining a first predetermined threshold vibration level; comparing measurements of flow induced vibrations to the first predetermined threshold; and when the measurements of flow induced vibrations are greater than the first predetermined threshold, automatically increasing or decreasing the natural frequency of the pipe section. The use of a threshold prevents over-controlling and ensures that control actions only take place when there is a significant level of vibration, it being recognised that a certain level of vibration is inevitable and not an indication of resonance, for example.

In response to the detection of vibration, the natural frequency of the pipeline may be increased by increasing a force applied to the pipeline or decreased by decreasing a force applied to the pipeline. Generally, the requirement will be to avoid resonance and it is recognised that if the control response is always to increase the force applied, unnecessary and undesirable stresses may be applied. Accordingly, once the applied force exceeds a predetermined amount, if FIV above the threshold occurs, the control response may be to reduce the applied force and hence the natural frequency.

In a more advanced implementation of the invention, rather than simply seeking to change the natural frequency from one found to be problematic, a desired "optimum" natural frequency may be determined and implemented. Thus, the method may further comprise the step of determining an optimum natural frequency of the pipe section which will not be excited by the flow induced vibrations measured, wherein the automatic adjusting of the natural frequency of the section of pipeline attains the optimum natural frequency. Such an optimum frequency may be calculated from first principles using known or measurable parameters or may be based on empirical data, look-up tables, etc. The predominant factor taken into account in when determining the predetermined thresholds and/or the optimum natural frequency of the pipe section is the measurement of FIV in the pipe section. However, other factors could be taken into account, including: the flow rate of liquid in the pipe; the density of liquid in the pipe; and the temperature; pressure of the liquid in the pipe; and/or the free span length between pipe supports of the pipe section (wherein the free span length is the length of the pipe section that is unsupported between supporting/fixing structures that are attached to the pipe section; free span length is one property that affects the natural frequency of the pipe section). Accordingly, in the method of the invention, the automatic adjusting of the natural frequency of the pipe section is also based on any one or a combination of the following factors: Flow speed of a liquid flowing through the pipe; liquid density of a liquid flowing through the pipe; pressure; temperature of a liquid flowing through the pipe; and/or the free span length between pipe supports of the pipe section, wherein any of these factors may be measured or predicted.

The invention is preferably applied in a continuous manner. Thus, preferably, the measurements of flow induced vibrations are taken repeatedly and the natural frequency of the pipe section may be adjusted in response such that the method forms a feedback loop. For example, the measurements and adjustments could be carried out at regular time intervals and/or whenever the flow rate or another parameter of the liquid flowing through the pipe changes.

The invention also extends to a corresponding system for implementing it. Thus, according to a further aspect, it provides an apparatus for controlling flow induced vibrations in a section of pipeline caused by a flow of liquid therethrough comprising: a sensor for measuring flow induced vibrations of the section of pipeline; a mechanical means for adjusting the natural frequency of the section of pipeline; wherein the mechanical means automatically adjusts the natural frequency of the section of pipeline based on the measured vibration in order to reduce the flow induced vibration.

Any suitable sensor may be employed for measuring vibrations. For example, the vibration sensor may include an accelerometer. Such an accelerometer may be a triaxial accelerometer attached to the surface or inner of the pipe section and configured to measure vibrations in both the radial and axial directions of the pipe section. Such accelerometers may also be solid state accelerometers; such accelerometers are particularly useful as they are resistant to shock and operate over a wide range of pressures and temperatures.

Preferably, a controller is arranged to receive measurements of flow induced vibrations from the sensor and to control the mechanical means in response thereto. The controller will typically be microprocessor-based and may be programmed to perform the method previously described. Measurements from the sensors can be transmitted to a controller via a wired or wireless communication link. The sensors and controller can be powered by any suitable power source. For example, they may be fitted with batteries or connected to electrical power via a wired connection.

Also, the mechanical means preferably applies a force to the section of pipeline in order to adjust the natural frequency of the section of pipeline.

As previously discussed, the force may be applied in a number of different ways. In one such approach, the force is applied substantially perpendicular to the axis of the section of pipeline. To achieve this, the mechanical means preferably comprises an attachment device connected to the pipe section at a distal end of the attachment device and connected to another body at a proximal end of the attachment device, thus connecting the pipe section and the other body, wherein the attachment device is configured to apply a tensile or compressive force between the pipe section and the other body. It thus may alter the natural frequency of the pipe section by automatically adjusting the distance between the pipe section and the other body such that the force between the pipe section and the other body is changed.

The attachment device may take any form suitable for applying such a force, but preferably, the attachment device comprises an arm extending between the pipe section and the other body. The arm may comprise a sleeve having a threaded shaft therein and being configured to adjust the length of the arm when the interior threaded shaft rotates. However, other means for adjusting the length of the arm, such as hydraulic actuators, may be employed.

As described above, an alternative approach is for the force to be applied substantially parallel to the axis of the section of pipeline. This may be achieved if the mechanical means applies a force between the adjacent ends of two adjacent parts of the section of pipeline.

A preferred system for achieving this is for the mechanical means to comprise a sleeve surrounding at least the adjacent ends of the first and second pipe sections and wherein the sleeve is arranged selectively to drive the adjacent ends towards or away from each other. The sleeve and pipe sections may be threadedly engaged and thus configured to convert rotational movement of the sleeve about its axis into linear movement of the first and second pipe sections relative to one another along their axis.

Although, as noted above, the apparatus may be driven by any suitable means, such as a hydraulic system, preferably a motor is provided to drive the mechanical means under the control of the controller as this provides a simple and readily controllable solution.

The controller is preferably configured to carry out the method as previously described.

The invention also extends to a device for use in the above-described system, which may be provided separately from the sensor and/or controller and installed in combination therewith. Thus, viewed from a still further aspect, the invention provides a device for controlling flow induced vibrations in a section of pipeline caused by a flow of liquid therethrough comprising: a mechanical means for connection to the section of pipeline and configured to adjust the natural frequency of the section of pipeline; wherein the mechanical means is drivable to adjust the natural frequency of the section of pipeline by applying a controllable force thereto in order to reduce the flow induced vibration.

The invention also extends to a software product for causing the controller to perform the method as previously described.

Certain embodiments of the present invention will now be described, by way of example only, with reference to the accompanying drawings, in which.

Figure 1:
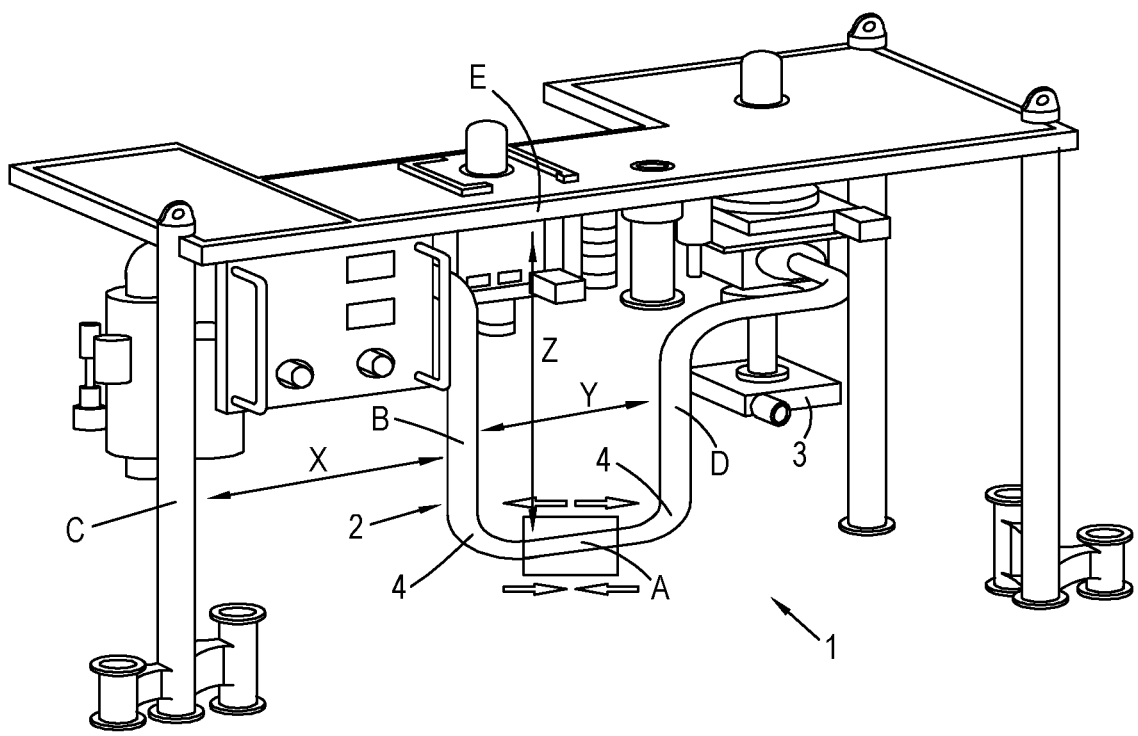
FIG. 1 is a perspective view of a typical subsea manifold and a section of piping with which embodiments of the present invention may be used.

A conventional manifold structure 1 for use with a subsea hydrocarbon collection facility is shown in FIG. 1. During the installation of a hydrocarbon collection facility, such a manifold structure 1 is typically submerged and positioned on a template subsea prior to the interconnection of various pipe sections. These may include a pipe section 2 forming an interconnection on the manifold structure itself. Pipe sections are also connected between Christmas trees and a connection point 3 on the manifold in order to form a flow line of produced fluid (not shown) from subsea reservoirs to the manifold 1. These pipe sections form parts of a flow line for hydrocarbon fluid from a subsea reservoir to a processing facility at the surface (not shown) and may suffer from flow-induced vibrations (FIV) where the pipe sections are induced to resonate at their natural frequencies by the flow of fluids therethrough. The embodiments described below are FIV reducing devices and related control systems.

As shown in FIG. 1, the pipe section 2 is formed with a number of bends 4 in order to provide the necessary flexibility to accommodate the required tolerances for the interconnection of the pipe section 2 to the manifold 1 after the manifold has been submerged. As a result of this design, pipe section 2 is particularly prone to FIV caused by the flow of hydrocarbon fluid therethrough during its lifetime. As such, it is necessary to control its natural frequency in order to reduce the dangers associated with FIV.

Figure 2:
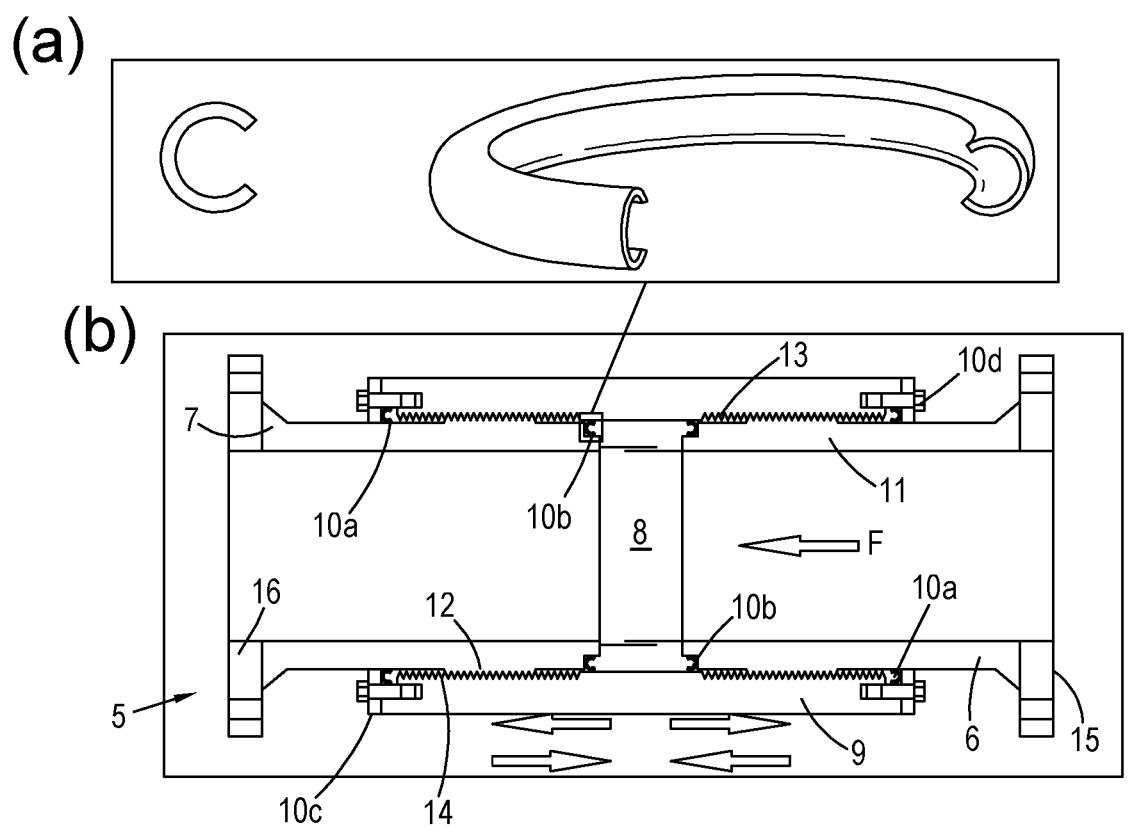
FIG. 2(b) is a sectional view of a part of an FIV reducing device according to a first embodiment fitted to a pipe section and (a) is an enlarged perspective view of a component thereof.

FIG. 2 shows a first embodiment of an FIV reducing device according to the invention that may be fitted to pipe sections of a flow line in order to automatically adjust its natural frequency, which it does by altering a tension applied along the axis of the pipe sections. In the discussion below, it is located at position A in FIG. 1.

Referring first to part (b) of the figure, flow line 5 is cylindrical and comprises a first pipe section 6 located upstream of a second pipe section 7; the flow direction F of the hydrocarbon fluid through the flow line 5 is from right to left in the figure. Pipe sections 6 and 7 are separate and can be moved relative to one another in the axial direction of the flow line 5, as described below, but cannot rotate about this axis.

FIG. 2(b) also shows an outer sleeve 9 surrounding the two pipe sections. This outer sleeve is cylindrical and extends around the entire circumference of each of the pipe sections. Outer and inner circumferential seals 10a, 10b are provided between pipe sections 6 and 7 and outer sleeve 9 to prevent the flow of liquid through the flow line from leaking through the outer sleeve 9. Outer seals 10a are held in place by end rings 10c held in place by machine screws 10d. One such seal is shown in more detail in part (a) of the figure.

The space 8 between the two pipe sections accommodates relative axial movement of the end of first pipe section 6 within second pipe section 7.

Pipe section 6 has a thread 11 on its exterior surface arranged in the clockwise direction relative to the flow of liquid shown in the figure and pipe section 7 has a thread arrangement 12 on its exterior surface in the opposite, counter-clockwise direction. Each of these threads 11, 12 engages with a corresponding thread 13, 14 on the interior surface of the outer sleeve 9.

The outer sleeve 9 may be rotated about pipe sections 6 and 7. When this is done, the threads described above convert the rotational movement of outer sleeve 9 relative to the pipe sections 6, 7 into an axial movement of the pipe sections 6, 7 relative to one another. For example, when the sleeve is rotated in the clockwise direction, the thread of pipe section 6 will cause pipe section 6 to move axially to the left in the figure whilst the thread arrangement of pipe section 7 may cause pipe section 7 to move axially to the right, bringing them closer together and reducing gap 8.

The opposite distal ends 15 and 16 respectively of pipe sections 6 and 7 are connected to other pipe sections or other structures in order to form a complete flow line and so they are essentially fixed in positions. Accordingly, axial movement of the pipe sections 6 and 7 towards one another results in increased tension in the pipe sections. Conversely, axial relative moment of them away from one another reduces such tension.

As is well known, tension plays an important role in determining the natural frequency of a pipe section. By altering the tension applied along the axis, the natural frequency of the pipe sections 6, 7 can be changed because an increase in tension increases the stiffness of the pipe section which in turn increases its natural frequency.

Figure 3:
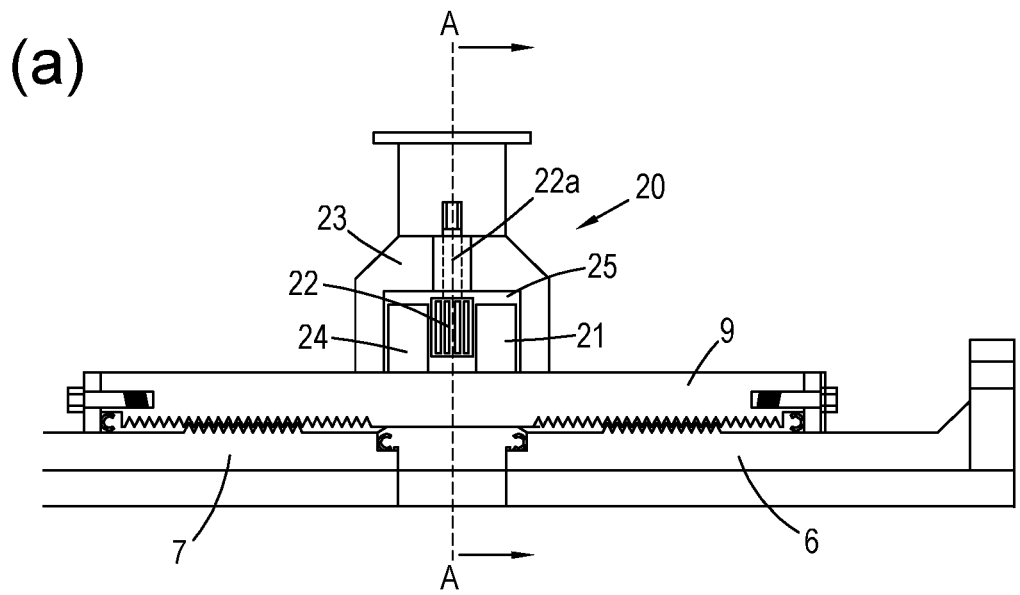
FIG. 3(b) is a sectional view corresponding to FIG. 2(b) showing additional components of the embodiment and FIG. 3(a) is an enlarged view of a part thereof.
Figure 3:
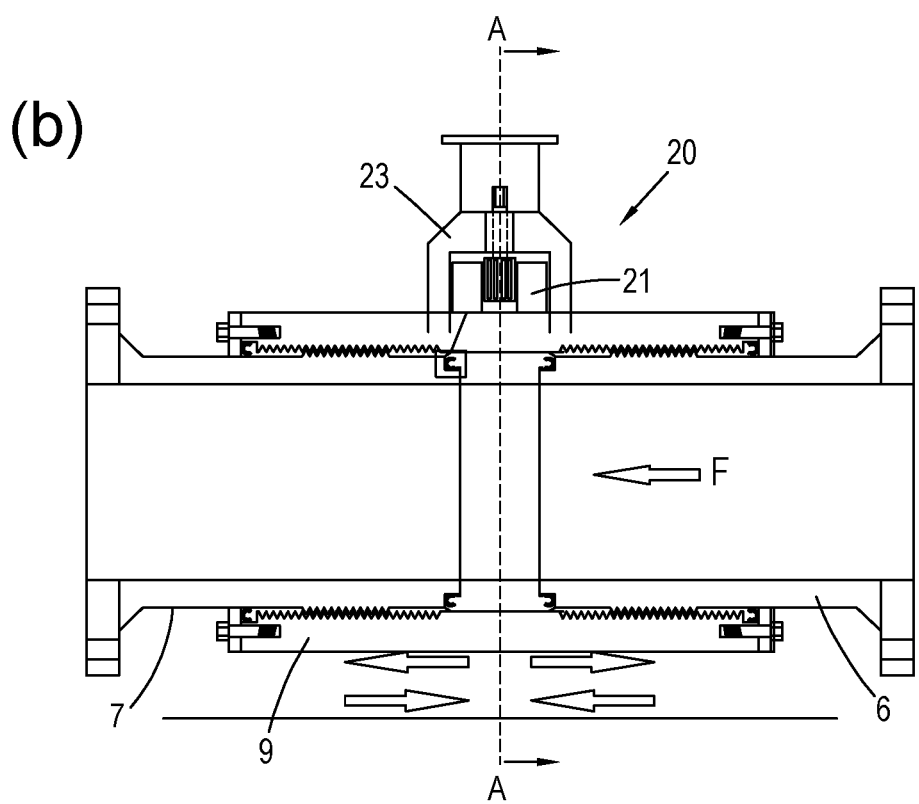
Figure 4:
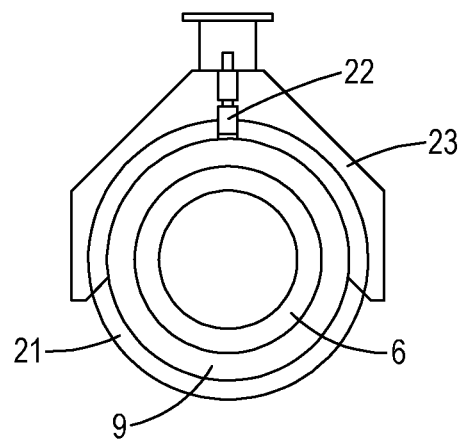
FIG. 4 shows a sectional view along the line A-A of FIGS. 3(a) and (b)

FIGS. 3 and 4 show a mechanism 20 (not shown in FIG. 2) that is employed to rotate the sleeve 9 described above and therefore alters the tension applied to a pipe section along its axis. The mechanism is shown in more detail in part (a) of the figure, with part (b) showing a similar view to that of FIG. 2(b).

Mechanism 20 comprises a toothed wheel 21 that is attached to and surrounds the outer sleeve 9 around its entire circumference. A further wheel 24 is provided around outer sleeve 9, which is similar to wheel 21 except that it is not toothed. Toothed wheel 21 engages with a pinion 22 which is mounted on a shaft 22a journaled within a housing 23 forming a yoke around outer sleeve 9 (see FIG. 4). The shaft is connected to and driven by an electric motor (not shown) located within the housing. The housing defines an inner void 25 within which the pinion 22 is located and which has sidewalls against which the outer surfaces of wheels 21 and 24 bear. This arrangement serves to locate the teeth of pinion 22 against the teeth of wheel 21.

By means of this arrangement, wheel 21 (and hence sleeve 9 attached thereto and wheel 24) may be turned by pinion 22 as it is rotated by the electric motor. (In alternative embodiments, a cage gear or a worm gear arrangement may be employed.)

When the wheel 21 and sleeve 9 are rotated, the tension in the pipe section is altered in the manner described previously and thus its natural frequency can be controlled by driving the motor.

FIG. 4 shows a cross section of the above-described arrangement through the line A-A shown in FIG. 3. Here, pipe section 6 can be seen surrounded by outer sleeve 9 which is in turn connected to and surround by wheel 21. Housing 23 contains the pinion 22 and partially surrounds the wheel 21.

This embodiment is suitable for use located within any a flow line where it is desired to alter the tension applied to the flow line parallel to its axis and accordingly vary the resonant frequency in order to reduce or avoid FIV.

Figure 5:
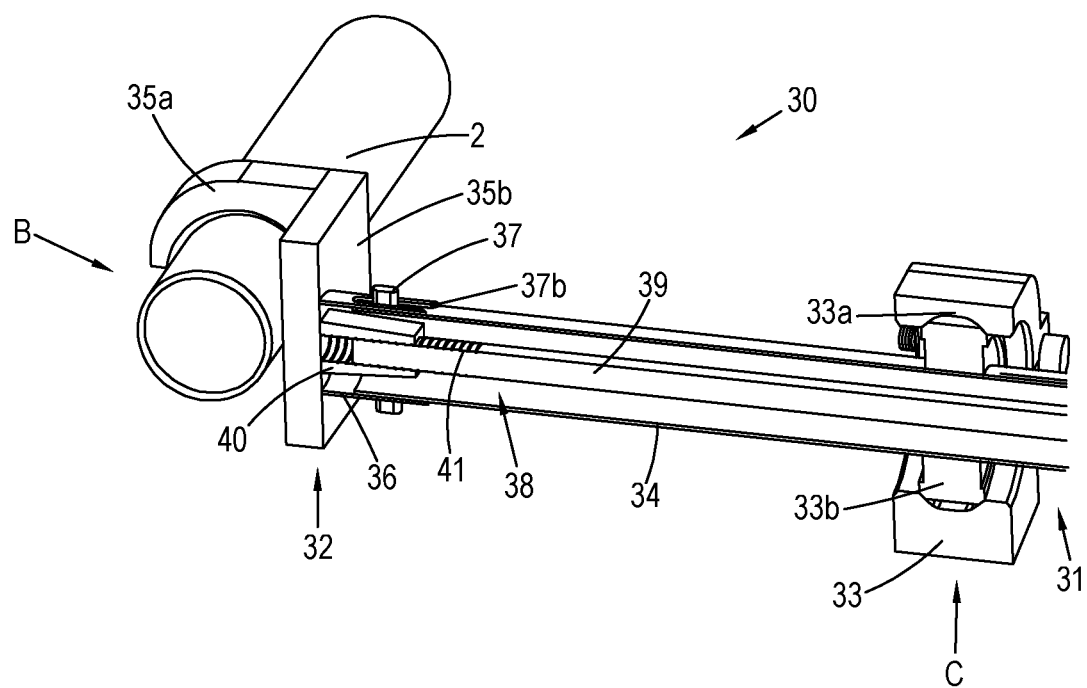
FIG. 5 is a partly cut-away perspective view of a second embodiment of FIV reducing device.

FIG. 5 shows an alternative embodiment of FIV reducing device 30 for applying tension to a pipe section 2. In the discussion below, it is located between positions B and C in FIG. 1. Using this embodiment, tension is applied substantially perpendicular to the axis of the pipe section 2 in order to change its natural frequency.

The FIV reducing device 30 has a proximal end 31, which is attached to a support structure (in this case at location C of FIG. 1) and a distal end 32 for attachment to the pipe 2 (at location B).

The proximal end comprises a mounting block 33, which may be attached by welding, bolting, etc. to rigid part C of the manifold support structure. (Alternatively, it may be attached to another section of piping via a suitable connection.) Within this, a ball-and-socket arrangement is provided comprising a socket 33a formed by the inner surface of the mounting block and an articulatable mount 33b. The latter slideably surrounds cylindrical sleeve 34, which extends to towards the distal end 32 of the device. The mounting block 33 is provided with a clamping mechanism (not shown), which allows the ball-and-socket arrangement to be locked in a given position and also locks the slideable connection to the sleeve 34. It may be locked and unlocked using an ROV, for example.

At its distal end 32, the device 30 comprises a claw 35a for grasping a section pipe 2, in this case at location B. (In a variant of this embodiment, this function may be provided by an additional ball type joint or a clamp that encloses the pipe section 36.) The claw 35a is mounted to claw plate 35b. This is attached to sleeve 34 via a stub sleeve 36, which is located around the distal end of sleeve 34 such that they are slidably connected. Keys 37 extend from the sleeve 34 and engage in slots 37b. This arrangement allows for translational motion (but not rotation) between the stub sleeve 36 and sleeve 34 along their common axis, thus allowing for a change in distance between the ball joint 33a, 33b and the claw 35a which grasps the section of pipe 2.

Inside the sleeve 34 is a translation mechanism 38 that comprises a central rod 39 engaged with head piece 40 at its distal end by means of a thread 41 on the distal end of the central rod mating with threads inside head piece 40. This in turn connected to claw plate 35b and claw 35a. The central rod 39 may rotated as desired by an electric motor (not shown) which may be contained within the outer sleeve, or in a separate housing at the proximal end thereof so that it can be easily accessed by an ROV.

As a result of the above-described arrangement, when the central rod 39 is rotated, head piece 40 moves linearly along the axis of the central rod (i.e. the central rod is either screwed into or unscrewed from the threaded head). The keys 37 and slots 37b ensure that it cannot rotate with the central rod. This linear motion in turn results in linear motion of the claw 35a, plate 35 etc. In this way, the rotation of central rod 39 can alter the length of the device between the claw 35a grasping the pipe section 2 and the ball joint 33a, 33b fixed to, for example, the support structure of the manifold. This applies a lateral force to the pipe, thereby adjusting its natural frequency.

The FIV reducing device 30 is designed to be pre-installed (at the surface) in a structure such as a sub-sea manifold. Accordingly, mounting block 33 is attached the manifold support structure at the surface at location C. The claw 35a may also be attached to location B on pipe 2 (assuming this pipe is not installed sub-sea). However, the clamping mechanism for the ball-and-socket arrangement 33a and 33b is not locked at this point, with the result that the outer sleeve is free to move in both an angular and a translational sense. Accordingly, the pipe 2 is free to move as necessary during the installation of the manifold and interconnection of related pipes and other components sub-sea. Once these procedures have been completed and pipe 2 is in its final position, the ball-and-socket arrangement 33a and 33b is locked by means of an ROV so that the pipe is held securely in that position by the clamp 35a.

In the situation where the pipe is not present when the manifold is at the surface and is instead installed sub-sea, claw 35a may be manipulated into position around it by an ROV with the ball-and-socket arrangement unlocked.

This embodiment can be used to apply a tension between a pipe section and any adjacent body. In the embodiments described above, with reference to FIG. 1, pipe section 2 was connected to a leg of the support structure of the manifold at C to provide tension in direction X. However, the pipe section could be connected to another pipe section at location D to provide tension in direction Y, and/or the pipe section could be connected to a platform of the manifold support structure at E to provide tension in direction Z.

Figure 6:
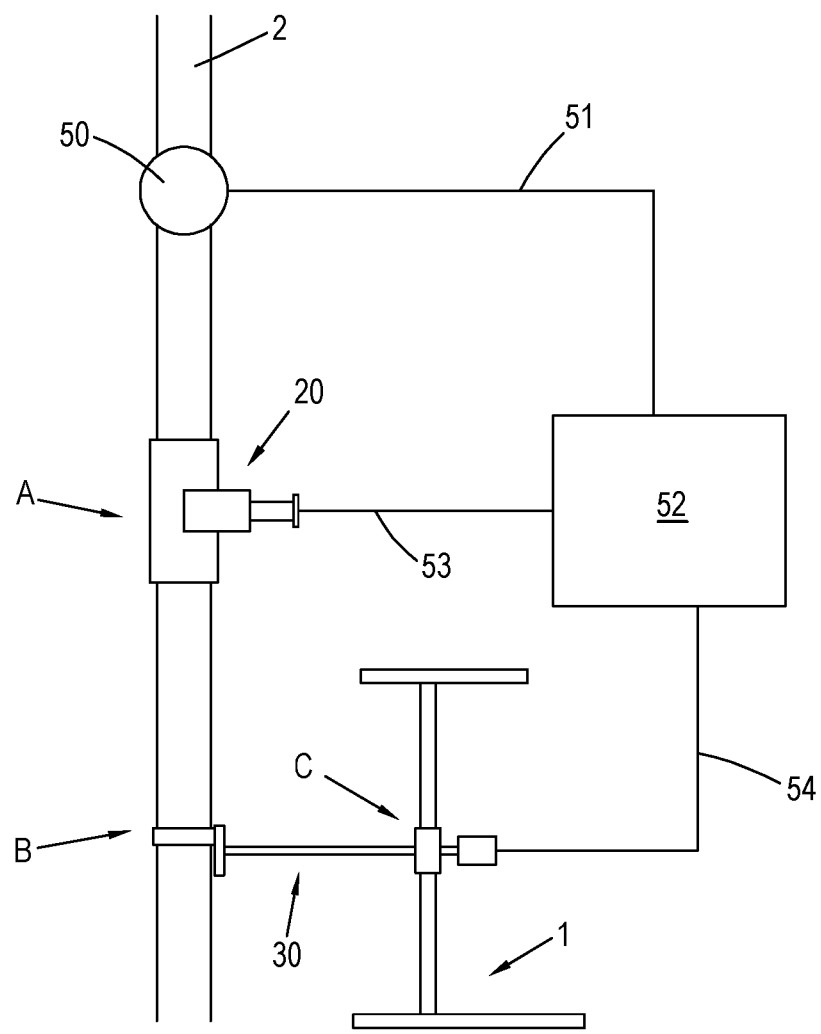
FIG. 6 is a schematic view of the FIV reducing devices of the first and second embodiments in combination with a controller.

The FIV reducing devices described above are used in conjunction with one or more sensors for measuring flow induced vibrations and a controller, as will now be described with reference to FIG. 6. This figure shows the FIV reducing devices of both the first embodiment 20 and the second embodiment 30 installed on manifold 1 where they are both attached to pipe 2. It should be understood that this figure is purely schematic and that the presence of the FIV reducing devices of both embodiments in this combination is purely for explanatory purposes.

Vibration sensor 50, which is a solid state tri-axial accelerometer, is mounted to the surface of pipe 2 and connected by means of a signal cable 51 to controller 52. Further cables 53 and 54 provide signal communications to and from the FIV reducing devices 20 and 30 respectively. These enable the motors of the devices to be activated and driven as required in order to adjust the tension in, or lateral force applied to, the pipe 2 as appropriate. The devices 20 and 30 may further comprise force/tension sensors and/or position sensors in order to provide feedback to the controller 52. They are provided with electrical power by supply cables (not shown).

In the event that the signals from vibration sensor 50 indicate that flow induced vibrations are present above a pre-determined threshold, controller 52 transmits a control signal to the motor of FIV reducing device 20 or 30 as appropriate, thereby causing the device to adjust the tension/force applied to the pipe. As it does so, the signals from vibration sensor 50 are monitored by controller 52 to provide feedback to the control process. Once the vibrations have been eliminated or reduced below a threshold value, the controller causes the motor of the device to stop. The controller may also monitor sensors provided in the devices 20, 30 to ensure that the forces applied to the pipe 20 are within appropriate limits etc.

As noted above, the measurements from the vibration sensors are evaluated by controller 52 against predetermined thresholds in order to determine whether FIV is present and poses a risk. If the measured vibrations exceed a first predetermined value, the natural frequency of the pipe is altered in order to reduce FIV and avoid resonance. For example, the tension applied to the pipe by any of the devices 20, 30 is increased, thus increasing the stiffness and natural frequency of the pipe. Alternatively, the natural frequency can be reduced in order to prevent resonance; for example, if the tension applied to the pipe section is already at a maximum. If the measured vibrations are below a second predetermined value, the tension applied to the pipe can be reduced. This is particularly useful in order to avoid unnecessary excessive tension on the pipe, which over its lifetime may fatigue or weaken it.

The invention claimed is:

1. A method of controlling flow induced vibrations in a section of pipeline caused by a flow of liquid therethrough, comprising:
   measuring a flow induced vibration of the section of pipeline; and
   automatically adjusting the natural frequency of the section of pipeline based on the measured vibration in order to reduce the flow induced vibration; wherein
   the natural frequency of the section of pipeline is adjusted by applying a force to the section of pipeline; wherein the force is one of:
      applied in a direction substantially parallel to the axis of the section of pipeline, and
      a net force that is applied in a direction substantially perpendicular to the axis of the section of pipeline.

2. The method of claim 1, wherein the force is applied in the direction substantially parallel to the axis of the section of pipeline, wherein the force is applied between a first part of the section of pipeline and an adjacent second part of the section of pipeline, and wherein the adjacent ends of the first and second parts are moveable relative to one another along their axis.

3. The method of claim 1, wherein the force is applied in the direction substantially perpendicular to the axis of the section of pipeline, and wherein the force is applied between the section of pipeline and a fixed structure and/or wherein the force is applied between the section of pipeline and a further section of pipeline.

4. The method of claim 1, further comprising the steps of:
   determining a first predetermined threshold vibration level;
   comparing measurements of flow induced vibrations to the first predetermined threshold; and
   when the measurements of flow induced vibrations are greater than the first predetermined threshold, automatically increasing or decreasing the natural frequency of the section of pipeline.

5. The method of claim 4, wherein the natural frequency is increased by increasing a force applied to the pipeline or decreased by decreasing a force applied to the pipeline.

6. The method of claim 1, further comprising the step of determining an optimum natural frequency of the section of pipeline which will not be excited by the flow induced vibrations measured, wherein the automatic adjusting of the natural frequency of the section of pipeline attains the optimum natural frequency.

7. The method of claim 1, wherein the measurements of flow induced vibrations are taken repeatedly and the natural frequency of the section of pipeline is adjusted in response such that the method forms a feedback loop.

8. The method of claim 1, wherein the automatic adjusting of the natural frequency of the section of pipeline is also based on any one or a combination of the following factors:
   i) Flow speed of a liquid flowing through the section of pipeline;
   ii) Liquid density of a liquid flowing through the section of pipeline;
   iii) Pressure and/or temperature of a liquid flowing through the section of pipeline;
   iv) Free span length between pipe supports of the section of pipeline;
   wherein any of these factors is measured or predicted.

9. An apparatus for controlling flow induced vibrations in a section of pipeline caused by a flow of liquid therethrough comprising:
   a sensor for measuring flow induced vibrations of the section of pipeline; and
   a mechanical means for adjusting the natural frequency of the section of pipeline;
   wherein the mechanical means automatically adjusts the natural frequency of the section of pipeline based on the measured vibration in order to reduce the flow induced vibration;
   wherein the mechanical means applies a force to the section of pipeline in order to adjust the natural frequency of the section of pipeline, and wherein the force is one of:
      applied substantially parallel to the axis of the section of pipeline, and
      a net force that is applied substantially perpendicular to the axis of the section of pipeline.

10. An apparatus as claimed in claim 9, wherein a controller is arranged to receive measurements of flow induced vibrations from the sensor and to control the mechanical means in response thereto.

11. An apparatus as claimed in claim 9, wherein the force is applied substantially perpendicular to the axis of the section of pipeline, and wherein the mechanical means comprises an attachment device connected to the section of pipeline at a distal end of the attachment device and connected to another body at a proximal end of the attachment device, thus connecting the section of pipeline and the other body, wherein the attachment device is configured to apply a tensile or compressive force between the section of pipeline and the other body.

12. The apparatus as claimed in claim 11, wherein the attachment device alters the natural frequency of the section of pipeline by automatically adjusting the distance between the section of pipeline and the other body such that the force between the section of pipeline and the other body is changed.

13. The apparatus of claim 12, wherein the attachment device comprises an arm extending between the section of pipeline and the other body, the arm comprising a sleeve having a threaded shaft therein and being configured to adjust the length of the arm when the interior threaded shaft rotates.

14. An apparatus as claimed in claim 9, wherein the force is applied substantially parallel to the axis of the section of pipeline, and wherein the mechanical means applies a force between the adjacent ends of two adjacent parts of the section of pipeline.

15. An apparatus as claimed in claim 14, wherein the mechanical means comprises a sleeve surrounding at least the adjacent ends of the adjacent parts and wherein the sleeve is arranged selectively to drive the adjacent ends towards or away from each other.

16. An apparatus as claimed in claim 15, wherein the adjacent parts are threadedly engaged and are configured to convert rotational movement of the sleeve about its axis into linear movement of the adjacent parts relative to one another along their axis.

17. An apparatus as claimed in claim 10, wherein a motor is provided to drive the mechanical means under the control of the controller.

18. An apparatus as claimed in claim 10, wherein the controller is configured to carry out the method of claim 1.

19. A device for controlling flow induced vibrations in a section of pipeline caused by a flow of liquid therethrough comprising:
- a mechanical means for connection to the section of pipeline and configured to adjust the natural frequency of the section of pipeline;
- wherein the mechanical means is drivable to adjust the natural frequency of the section of pipeline by applying a controllable force thereto in order to reduce the flow induced vibration, wherein the force is one of:
  - applied substantially parallel to the axis of the section of pipeline, and
  - a net force that is applied substantially perpendicular to the axis of the section of pipeline.

* * * * *